United States Patent [19]

Takeda

[11] Patent Number: 4,803,057
[45] Date of Patent: * Feb. 7, 1989

[54] CONTINUOUS CHROMATOGRAPHIC SEPARATION OF URANIUM ISOTOPES

[75] Inventor: Kunihiko Takeda, Yokohama, Japan

[73] Assignee: Asahi Kasei Kogyo Kabushiki Kaisha, Osaka, Japan

[ * ] Notice: The portion of the term of this patent subsequent to May 3, 2005 has been disclaimed.

[21] Appl. No.: 910,864

[22] Filed: Sep. 24, 1986

Related U.S. Application Data

[63] Continuation of Ser. No. 669,390, Nov. 8, 1984, abandoned.

[30] Foreign Application Priority Data

Nov. 30, 1983 [JP] Japan .................. 58-224271

[51] Int. Cl.$^4$ ............... C22B 60/02; B01D 59/30; C01G 43/00
[52] U.S. Cl. ........................ 423/6; 423/2; 423/7
[58] Field of Search ..................... 423/6, 7

[56] References Cited

U.S. PATENT DOCUMENTS

| | | | |
|---|---|---|---|
| 4,049,769 | 9/1977 | Seko et al. | 423/7 |
| 4,092,398 | 5/1978 | Miyake et al. | 423/7 |
| 4,112,044 | 9/1978 | Miyake et al. | 423/7 |
| 4,118,457 | 10/1978 | Seko et al. | 423/7 |
| 4,202,860 | 5/1980 | Miyake et al. | 423/6 |
| 4,748,008 | 5/1988 | Takeda et al. | 423/6 |

Primary Examiner—John F. Terapane
Assistant Examiner—Virginia B. Caress
Attorney, Agent, or Firm—Birch, Stewart, Kolasch & Birch

[57] ABSTRACT

A process for continuously separating uranium isotopes by an oxidation-reduction reaction using an anion exchanger comprising the steps of feeding an eluant containing a deactivated oxidizing agent and a deactivated reducing agent to an anion exchanger to regenerate them and to form an oxidizing agent zone in the anion exchanger, and reusing the regenerate reducing agent and the oxidizing agent zone for further uranium isotope separation.

10 Claims, 2 Drawing Sheets

CONTINUOUS CHROMATOGRAPHIC SEPARATION OF URANIUM ISOTOPES

This application is a continuation of application Ser. No. 669,390, filed on Nov. 8, 1984, now abandoned.

BACKGROUND OF THE INVENTION

1. Field of the Invention

This invention relates to an improved process for the chemical separation of uranium isotopes by using an anion exchanger.

More particularly, this invention relates to a process for separating uranium isotopes by oxidationreduction chromatography through an anion exchanger in which both a deactivated oxidizing agent and a deactivated reducing agent are regenerated with an anion exchanger used for the separation of uranium isotopes.

2. Description of the Prior Art

It is known that uranium isotopes can be separated by developing a uranium adsorption zone on an anion exchanger as the adsorbent in its displacing state while oxidizing the uranium adsorption zone at its frontal region and reducing the uranium adsorption zone at its rear region (see British Pat. No. 1,443,962, U.S. Pat. Nos. 4,049,769, 4,092,398, 4,112,044 and 4,118,457). According to these methods a relatively high efficiency of separating uranium isotopes can be obtained.

According to one conventional process for separating uranium isotopes by an oxidation-reduction reaction using an anion exchanger, a solution containing an oxidizing agent which is capable of oxidizing uranium (IV) to uranium(VI) is supplied to a developing column packed with an anion exchanger to form an oxidizing agent adsorption zone, followed by supplying a uranium isotope solution containing uranium (IV) to convert a portion of oxidizing agent adsorption zone to an adsorbed uranium (VI) zone and then supplying a solution containing a reducing agent which is capable of reducing uranium (VI) to uranium (IV) to reduce uranium (VI) absorbed on the anion exchanger to be eluted in the form of uranium (IV)

Thus, a boundary is formed between the oxidizing agent zone and the uranium adsorption zone in the front portion, in the direction of flow, of the uranium adsorption zone, and the uranium solution recovered from the vicinity of this boundary has a higher concentration of uranium-238. Also, a boundary is formed between the uranium adsorption zone and the reducing agent zone in the rear portion, in the direction of flow, of the uranium adsorption zone, and the uranium solution recovered from the vicinity of this boundary has a higher concentration of uranium-235.

In this separation of uranium isotopes it is also known that more than one developing column filled with an anion exchanger may be employed, and the eluted solution containing uranium (IV) is fed from one developing column to the next packed with an anion exchanger where an oxidizing adsorption zone is already formed, thereby continuously forming a uranium adsorption zone, and then passing a solution containing a reducing agent therethrough.

In these operations uranium atoms should be in an anionic form. Uranium ion which is not coordinated with a ligand is usually in a cationic form. Thus, a uranium cation is converted to a uranium anion by forming complex compounds with negatively charged ligands. As used herein and in the appended claims, the term "uranium (IV)" denotes all tetravalent uranium ions including complex ions, and the term "uranium (VI)" denotes all hexavalent uranium ions including complex ions In these operations, a deactivated oxidizing agent and a deactivated reducing agent are eluted as a mixture from a developing column.

A method for regenerating a deactivated oxidizing agent and a deactivated reducing agent in the eluant from a developing column and for reusing them is disclosed in USP No. 4,202,860.

According to the method, an eluant containing a deactivated oxidizing agent and a deactivated reducing agent is subjected to an oxidation reaction to activate the deactivated oxidizing agent, the activated oxidizing agent is separated from the resulting eluant, then the resulting eluant containing the deactivated reducing agent is subjected to a reduction reaction to activate the deactivated reducing agent, and the activated oxidizing agent and the activated reducing agent thus obtained are reused, respectively, for further separation of uranium isotopes.

In this process, the activation of the deactivated oxidizin,g agent or the deactivated reducing agent is carried out by oxidation-reduction reaction using oxygen or hydrogen, or by electrolysis oxidation-reduction reaction outside the developing column.

SUMMARY OF THE INVENTION

It is an object of the present invention to provide an improvement in the continuous separation of uranium isotopes by passing a solution of a mixture of uranium isotopes in a solvent through an anion exchanger thereby forming on the anion exchanger a boundary (A) between a uranium adsorption zone and an adjacent reducing agent zone and a boundary (B) between a uranium adsorption zone and an adjacent oxidizing agent zone, the uranium adsorption zone advancing through the anion exchanger, effecting reduction at the boundary (A) and effecting oxidation at the boundary (B), thereby effecting enrichment adjacent the boundary, and separating a fraction enriched in one of the isotopes In accordance with the improvement, there is employed as the reusing process of the oxidizing agent and the reducing agent, a process comprising the steps of:

passing an eluant containing a deactivated oxidizing agent and a deactivated reducing agent as a mixture through an anion exchanger to be used for isotope separation to convert the deactivated oxidizing agent and the deact:,vated reducing agent to an activated oxidizing agent and an activated reducing agent, respectively and reform an oxidizing agent zone on the anion exchanger,and reusing the activated reducing agent for the reduction of uranium.

In a known developing method, the total amounts of the deactivated reducing agent and the deactivated oxidizing agent need to be converted by an oxidation-reduction reaction with hydrogen, oxygen or electrolysis oxidation-reduction. On the contrary, the present developing method only requires the consumption of sufficient amounts of hydrogen gas, oxygen gas or electric power necessary for oxidation of the reducing agent or reduction of the deactivated reducing agent mixed in the solution in the vicinity of the boundary between the oxidizing agent zone and the reducing agent zone.

Thus, this process may decrease the cost of separation of uranium isotopes and enhance the economical merit of the industrial process.

DETAILED DESCRIPTION OF THE INVENTION

Figure 1:
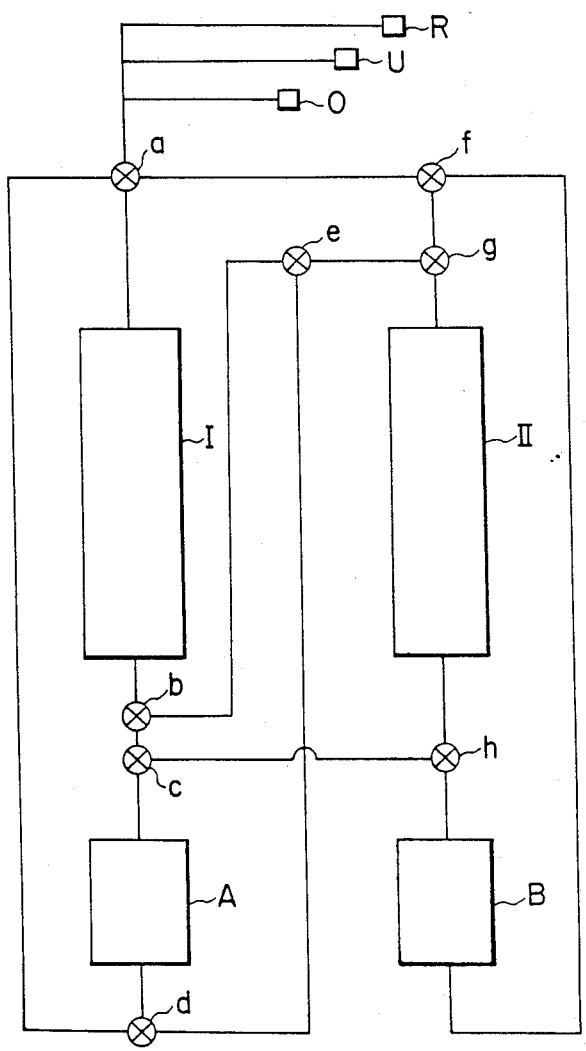
FIG. 1 illustrates the flow diagram of an apparatus of one embodiment of this invention wherein two developing columns are employed

In this invention, when an eluant containing a deactivated oxidizing agent and a deactivated reducing agent that flowed out from the bottom of a developing column used for isotope separation is fed into a column packed with an anion exchanger, an oxidation-reduction reaction of the deactivated oxidizing agent and the deactivated reducing agent occurs in the column to convert them to the activated state and the activated oxidizing agent is adsorbed on the anion exchanger separate the activated oxidizing agent from the eluant containing the activated reducing agent and reform an oxidizing agent absorption zone in the column.

For simplicity in the following explanation, an oxidizing agent, a reducing agent and uranium are denoted by the symbols "O", "R" and "U", respectively, and a lower oxidation number and a higher oxidation number are denoted by the suffix "I" and suffix "II", respectively For example, $O_I$ denotes an oxidizing agent in the deactivated state whose oxidation number is decreased, $R_I$ denotes a reducing agent in the active state with a lower oxidation number, and $U_I$ and $U_{II}$ denote uranium (IV) and uranium (VI), respectively.

The activation system in a developing column is illustrated as follows.

The deactivated oxidizing agent $O_I$ reacts to a low degree with the deactivated reducing agent $R_{II}$ in a solution and there are trace amounts of the activated oxidizing agent $O_{II}$ and trace amounts of the activated reducing agent $R_I$ as an equilibrium mixture in the solution.

When the solution containing $O_I$ and $R_{II}$ is fed into a developing column packed with an anion exchanger, $O_{II}$ is adsorbed on the anion exchanger, and the $O_{II}$ concentration in a solution contacted with an anion exchanger in a developing column, consequently decreases to upset the state of equilibrium. Then an oxidation-reduction reaction between $O_I$ and $R_{II}$ proceeds to produce a small amount of $O_{II}$ and $R_I$. By the adsorption of this regenerated $O_{II}$ on the anion exchanger, further oxidation-reduction reaction proceeds continuously.

Therefore, by feeding a solution containing $O_I$ and $R_{II}$ into a developing column, an oxidizing agent adsorption zone is formed on an anion exchanger packed in the developing column and $R_I$ having low adsorbability, which may be reused for uranium isotope separation as a reducing agent, flows out from the bottom of the developing column.

As mentioned above, this invention has been achieved by taking advantages of the different adsorbabilities of $O_I$, $O_{II}$, $R_I$ and $R_{II}$ on an anion exchanger.

In the present invention, it is preferred that the adsorbability of $O_{II}$ is higher and the adsorbability of $R_I$ is lower, and from the viewpoint of formation of a uranium adsorption band, it is preferred that the adsorbabilities of $O_I$ and $R_{II}$ are lower.

According to the present invention, U(VI) ion adsorbs on an anion exchanger more selectively than U(IV) ion and uranium-235 of U(VI) ion remains on the anion exchanger and the uranium-235 concentration increases as it comes closer to the rear boundary of the uranium adsorption zone with the progress of development of a reducing agent, whereby uranium-235 is concentrated at the rear boundary of the uranium adsorption zone.

The embodiment for the separation system of uranium isotopes which may be employed in this invention is the band method.

The band method comprises passing an acidic solution through a developing column packed with an exchanger to condition the exchanger, feeding an oxidizing agent solution to the column to adsorb the oxidizing agent on the exchanger, feeding a uranous or mixed uranous or uranyl solution to the column to effect oxidation with the formation of a uranium adsorption zone, and further feeding a reducing agent solution to the column, thereby developing the uranium adsorption zone by displacement while effecting oxidation at the downstream end of the uranium adsorption zone and effecting reduction at the upstream end of the uranium adsorption zone. According to the band method there can be obtained a region having a higher uranium-238 concentration near the oxidation boundary of the uranium adsorption zone and a region having a higher uranium-235 concentration near the reduction boundary of the uranium adsorption zone.

The separation of uranium isotopes according to this invention is carried out in an acidic solution The hydrogen ion concentration of the acidic solution typically ranges from about $10^-$M to about 11M and preferably from about $10^-$M to about 10M. Typical examples of suitable acids are inorganic acids such as hydrochloric acid, hydrobromic acid, sulfuric acid and hydrofluoric acid, etc.

The acidic solution may also contain an electron exchange catalyst as disclosed in U.S. Pat. Nos. 4,112,044 and 4,049,769.

The solvent medium may be water, an organic solvent such as methanol, ethanol, ethylene glycol, dioxane, formic acid, acetone, etc. or a mixture of water with the organic solvent.

The concentration of uranium ions in the solution ranges from about $10^-$M to about 4M and preferably from about $10^{-2}$M to about 2M.

The concentration of negatively charged ligands typically ranges from about $10^{-3}$M to about 12M and preferably from about $10^{-1}$M to about 10M.

Exemplary ligands which can be used include inorganic ions such as $F^-$, $Cl^-$, $Br^-$, $NO_3^-$, $SCN^-$, $CN^-$, $SO_4^{2-}$, in the form of an acid or water soluble salts such as the sodium, potassium, or ammonium salts, etc.; ions of monocarboxylic acids such as acetic acid, monochloroacetic acid, dichloroacetic acid, etc.; ions of dicarboxylic acids such as oxalic acid, malonic acid, maleic acid, phthalic acid, etc.; ions of hydroxy acids such as glycolic acid, $\beta$-hydroxypropionic acid, citric acid, lactic acid, hydroxysuccinic acid, tartaric acid, sulfosalicylic acid, etc.; ions of amino acids such as glycine, alanine, $\beta$-alanine, aspartic acid, glutamic acid, etc.; ions of aminopolycarboxylic acids such as nitrilotriacetic acid, ethylenediamine tetraacetic acid, 1,2-cyclohexanediamine tetraacetic acid, etc.; and the water soluble salts such as the sodium, potassium and ammonium salts of these acids.

The temperature which may be employed in the separation of uranium isotopes according to this invention can be varied widely, depending upon the selectivity of uranium for the anion exchanger which is determined by the oxidizing agent, thereducing agent, the concentration of the inorganic acids employed, and the oxidation-reduction velocity of uranium, and typically ranges from about 10° C. to about 250° C. and preferably from about 30° C to about 200° C.

The pressure in separating uranium isotopes in the present process is not critical, and can be varied typically from atmospheric pressure to about 120 kg/cm$^2$. In general, the separation is carried out above atmospheric pressure at a temperature below the boiling point of the solvent medium employed in the solution Alternatively, when the temperature is higher than the boiling point of the solvent medium employed, the separation is carried out under a pressure above atmospheric sufficient to prevent the solvent medium from boiling The linear velocity of boundary displacement typically ranges from about 5 cm per day to about 1000 m per day, preferably from about 1m to about 500 m per day.

The preferred oxidizing agents which can be used in combination with the above described solution include compounds of T(III), Pb(IV), Sb(V), V(IV), Cr(VI), Mn(VII), Fe(III), Co(III) and Cu(II). Of these oxidizing agents, the compounds of Cr(VI), Mn(VII), Fe(III) and Cu(II) are more preferably used.

The concentration of the oxidizing agent typically ranges from about 0.01 M to about 5 M.

The preferred reducing agents which can be used in combination with the above described solution include compounds of In(I), Sn(II), Sb(III), Ti(III), V(II) and Cu(I). Of these reducing agents, the compounds of Sn(II), Ti(III) and V(III) are more preferably used The concentration of the reducing agent typically ranges from about 0.01 M to about 5 M.

Any combinations of the above described oxidizing agents and reducing agents may be employed in the separation of uranium isotopes by an oxidation-reduction reaction according to this invention.

Any anion exchangers which can retain uranium (VI) and can selectively release uranium (IV) formed by a reducing agent as an eluant can be used as the anion exchanger in this invention.

Exemplary anion exchangers which can be employed in this invention include chloromethylated and aminated products of a crosslinked high molecular weight polymer prepared by addition copolymerization of styrene, vinyltoluene and ethylvinylbenzene with divinylbenzene as the main components; aminated products of a cross-linked polymer prepared by addition copolymerization of, as the main components, a monomer having an active group such as chloromethylstyrene, methylethyl ketone, epoxybutadiene or acrylamide with a cross-linking monomer such as divinylbenzene or triallyl cyanurate; cross-linked polymers prepared by polymerization of a monomer having a nitrogen capable of becoming an exchange group such as N-vinylsuccinimide, N-vinylphthalimide, vinylcarbazole, vinylimidazole, vinylpyridine, vinyltetrazole, vinylquinoline or divinylpyridine as the main component or by copolymerization of such a monomer having a nitrogen capable of becoming an exchange group with a cross-linking monomer, if desired, or reaction products with such a monomer having a nitrogen capable of becoming an exchange group; a cross-linked polycondensate prepared by condensation of an amine such as polyethyleneimine or hexamethylenediamine with a polyfunctional compound; and those in which an ion exchangeable liquid such as tributyl phosphate or trioctylamine is supported on the solid surface of silica gel or a zeolite.

Ion exchangers which are preferably employed in the process of the present invention are strongly basic anion exchangers having quaternary ammonium groups therein prepared by chloromethylating styrene-divinylbenzene copolymers, followed by amination, or weakly basic anion exchangers having primary or tertiary amine groups therein.

To provide a clearer and better understanding of this invention, reference will now be made to preferred embodiments thereof in connection with the flow diagrams shown in the drawings.

In the embodiment illustrated in FIG. 1 which is a basic recycling system according to the process of the present invention, I and II denote developing columns, respectively; 0 a reservoir for an oxidizing agent solution; R a reservoir for a reducing agent solution; U a reservoir for a uranium solution; a, b, c, d, e, f, g and h, switchover valves; A supplementary oxidizing apparatus; and B a supplementary reducing apparatus.

An exemplary supplementary oxidizing apparatus comprises an autoclaved column equipped with a jacket packed with glass Raschig rings and a liquid-gas separator connected to the column.

The oxidation reaction is carried out by supplying a solution containing a reducing agent and oxygen gas from the bottom of the autoclaved column so that the reducing agent and oxygen gas contact each other.

An exemplary supplementary reducing apparatus comprises an autoclaved column equipped with a jacket packed with a reducing catalyst supported on a carrier, and a liquid-gas separator connected to the column The reduction reaction is carried out by supplying a solution containing a deactivated reducing agent and hydrogen gas from the bottom of the autoclaved column so that the deactivated reducing agent and hydrogen gas contact each other.

In the event that it is necessary to reuse the activated reducing agent for further uranium isotope separation, the supplementary reducing apparatus is used for reducing the deactivated reducing agent mixed in the solution containing the activated reducing agent.

On the other hand, the supplementary oxidizing apparatus is used for oxidizing the reducing agent mixed in an eluant containing the deactivated reducing agent and the deactivated oxidizing agent.

When a deactivated oxidizing agent and a deactivated reducing agent are fed into a developing column, the activated reducing agent flows out from the developing column accompanied with the formation of an oxidizing agent zone in the developing column. Since this activated reaction in the developing column occurs in a flowing system, the concentration gradient of the active reducing agent or the deactivated reducing agent in the solution in the vicinity of the front boundary of the oxidizing agent zone, is observed in the direction of the development and there is a region in which the activated reducing agent and the deactivated reducing agent are mixed.

It is necessary for stable and continuous chromatographic development reusing both the solution containing the deactivated reducing agent and the deactivated oxidizing agent and the solution containing the activated reducing agent, that the concentration of the activated reducing agent or the deactivated reducing gent in each solution is kept at a constant value. Therefore, the deactivated reducing agent mixed in the solution containing the activated reducing agent should be activated and the reducing agent mixed in the solution containing the deactivated oxidizing agent and the deactivated reducing agent should be oxidized.

First, a mixed solution containing $O_I$ and $R_{II}$ is supplied to the developing column I packed with an anion exchanger through a route 0-a-I. In the developing column I, the aforementioned oxidation-reduction reaction proceeds to convert $O_I$ to $O_{II}$ and form an oxidizing agent zone. At this time, resulting eluant containing $R_I$ and some $R_{II}$ is supplied to the supplementary reducing apparatus B through a route I-b-c-h-B to convert the $R_{II}$.

Then, a solution containing $U_I$, or $U_I$ and $U_{II}$ is supplied to the developing column I through a route U-a-I and brought into contact with the oxidizing agent zone to form a $U_{II}$ adsorption zone.

Subsequently, the development is started by supplying $R_I$ to the developing column I through a route R-a-I, and R is brought into contact with the $U_{II}$ adsorption zone to elute $U_{II}$ while simultaneously reducing $U_{II}$ to $U_I$. Thus, the $U_{II}$ adsorption zone moves in the downstream direction.

At this time, a mixed solution containing $O_I$ mainly produced by oxidation-reduction reaction at the boundary between a uranium adsorption zone and an adjacent oxidizing agent zone and $R_{II}$ mainly produced by an oxidation-reduction reaction at the boundary between a uranium adsorption zone and an adjacent reducing agent zone, is eluted from the developing column I. This eluant is supplied to the supplementary oxidizing apparatus to oxidize a trace amount of $R_I$ being mixed.

Then, the resulting solution containing $R_{II}$ and $O_I$ after oxidation is supplied to the developing column II through a route A-d-e-g-II to complete the first step operation, that is, which comprises activation of a deactivated reducing agent and a deactivated oxidizing agent and formation of an oxidizing agent zone.

The resulting solution containing $R_I$ and a trace amount of $R_{II}$ is supplied to the supplementary reducing apparatus through a route II-h-B to reduce the $R_{II}$ and then the $R_I$ thus obtained is reused for developing the uranium adsorption zone. Thus the uranium adsorption zone continuously moves in the downstream direction, and finally reaches the bottom of the developing column I.

Subsequently, the uranium eluant is supplied through a route I-b-e-g-II to the developing column II where an oxidizing agent zone is already formed When the uranium adsorption zone has completely moved from the developing column I to the developing column II, the route of supplying $R_I$ is changed to a route B-f-g-II to further move the uranium adsorption zone in the downstream direction. The eluant from the developing column II is supplied to the supplementary oxidizing apparatus A through a route II-h-c-A to oxidize the $R_I$ being mixed.

The resulting solution containing $O_I$ and $R_{II}$ is supplied to the developing column I for the activation of the deactivated oxidizing agent and the deactivated reducing agent, and the formation of an oxidizing agent zone.

Thus, this operation is repeatedly performed until the composition of uranium isotopes becomes a desirable composition.

In a process for activating a deactivated reducing agent and a deactivated oxidizing agent and for forming an oxidizing agent zone, the oxidizing agent zone is not necessarily required to spread over the whole developing column, and separation of uranium isotopes and activation if the deactivated reducing agent and the deactivated oxidizing agent may proceed simultaneously in one developing column.

Figure 2:
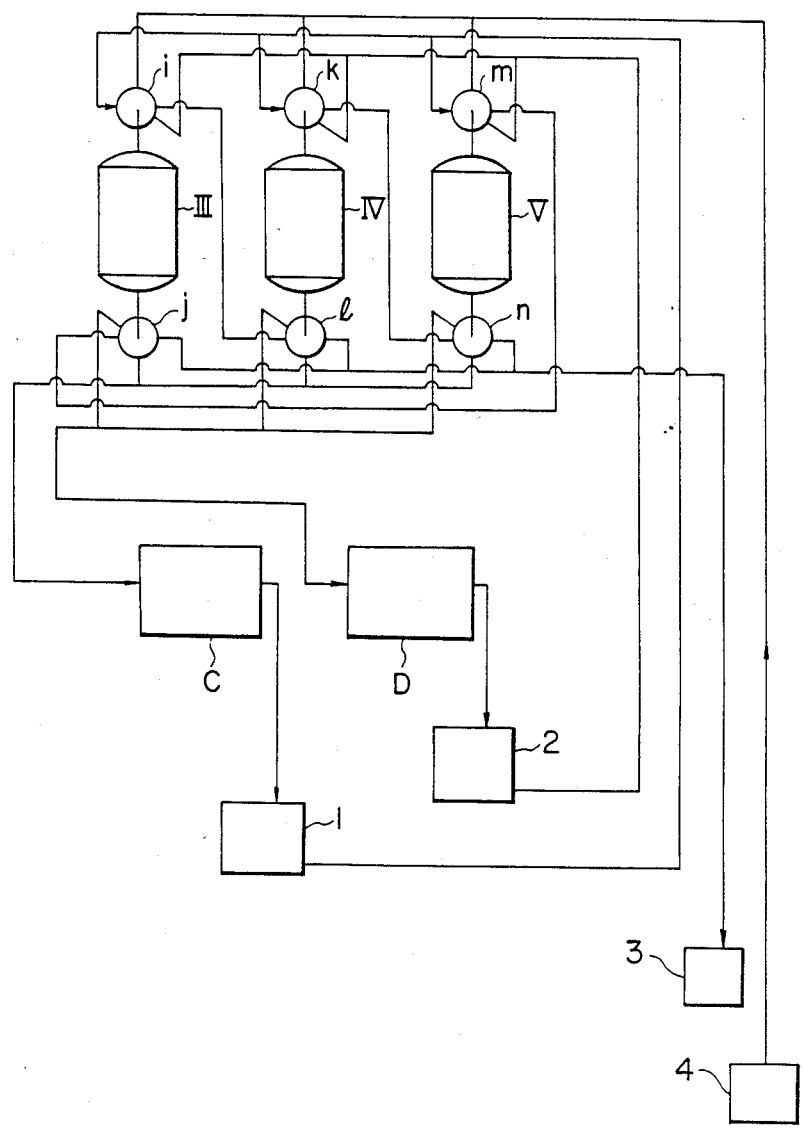
FIG. 2 illustrates the flow diagram of an apparatus of one embodiment of this invention wherein three developing columns are employed

In another embodiment of this invention illustrated in FIG. 2 which is a recycle system using three developing columns, III, IV and V denote developing columns, respectively; C a supplementary oxidizing apparatus; D a supplementary reducing apparatus; 1 a reservoir for a deactivated reducing agent and a deactivated oxidizing agent; 2 a reservoir for a reducing agent; 3 a reservoir for a product; 4 a reservoir for a uranium solution; and i, j, k, l, m and n each switchover valves.

Prior to starting the operation, an anion exchanger is uniformly packed in each of the developing columns III, IV and V, $O_I$ and $R_{II}$ are charged in a reservoir 1, $R_I$ in a reservoir 2 and a starting uranium solution (a solution containing $U_I$, or $U_I$ and $U_{II}$) in a reservoir 4.

First, $O_I$ and $R_{II}$ are supplied through a route 1-i-III to activate $O_I$ and $R_{II}$ and to form an oxidizing agent zone in the developing column III. The eluant containing the activated reducing agent RI is supplied to the supplementary reducing apparatus D through a route III-j-D to reduce the $R_{II}$ being mixed and then the resulting solution is stored in a reservoir 2 for the reducing agent.

Second, $U_I$ or $U_I$ and $U_{II}$ is supplied through a route 4-i-III to form a $U_{II}$ adsorption zone in the developing column III, the eluant from the developing column III is supplied to the supplementary oxidizing apparatus C for oxidation of the $R_I$ being mixed in the developing column III and the resulting solution is stored in a reservoir 1. Simultaneously $O_I$ and $R_{II}$ are supplied through a route 1-m-V to activated $O_I$ and $R_{II}$ and to form an $O_{II}$ adsorption zone, the eluant from the developing column V is supplied to the supplementary reducing apparatus for reduction of the $R_{II}$ being mixed and the resulting solution is stored in a reservoir 2.

When the $U_{II}$ adsorption zone has reached the vicinity of the lower portion of the developing column III, the eluant from the developing column III is supplied through a route III-j-m-V to form a $U_{II}$ adsorption zone over the developing columns III and V. During this time, $O_I$ and $R_{II}$ in a reservoir 1 are supplied through a route 1-k-IV to form an oxidizing agent zone in the developing column IV.

When the front boundary of the $U_{II}$ adsorption band has reached the proper portion of the developing column V, $R_I$ is supplied through a route 2-i-III-j-m-V to move the $U_{II}$ adsorption zone over the developing III and V.

When the front boundary of the $U_{II}$ adsorption zone has reached the lower portion of the developing column V, the flow route of the eluant from the developing column is switched over to a route V-n-k-IV from a route V-n-C-1 to move the $U_{II}$ adsorption zone over the developing columns V and IV.

When the development has further proceeded and the whole uranium adsorption zone in the developing column III has been moved to the developing column V, the flow route of the solution is switched over to a route 2-m-V-n-k-IV-l-C-1-i-III-j-D-2 At this time, the $U_{II}$ adsorption zone expands over the developing column V and IV and the $O_{II}$ adsorption zone is reformed in the developing column III.

When the whole uranium adsorption zone in the developing column V has been moved to the developing column IV, the flow route of the solution is switched over to a route 2-k-IV-(-i-III-j-C-1-m-V-n-D-2.

Thus, as the uranium adsorption zone is moved by successively switching over the solution flow route, the separation of uranium isotopes proceeds at the front boundary between a uranium adsorption zone and an oxidizing agent zone and at the rear boundary between a uranium adsorption zone and a reducing agent zone. When the composition of the isotopes has reached a desirable composition, the product can be collected in a reservoir 3 using any route of j-3, (-3 and n-3.

As there are illustrated examples using two or three developing columns in FIG. 1 or FIG. 2, the process of the present invention may be carried out using two or more developing columns.

Thus, according to the process of the present invention the continuous separation of uranium isotopes can be efficiently performed without requiring any steps of regenerating a deactivated oxidizing agent and a deactivated reducing agent. Furthermore, adsorption of an oxidizing agent on an anion exchanger can be readily and easily performed by supplying a deactivated oxidizing agent and a deactivated reducing agent to a developing column in which the rear boundary of a uranium adsorption zone or from which a uranium adsorption zone has been moved.

EXAMPLE 1

FIG. 2 shows the system employed in this Example. The developing means used included three columns III, IV and V, each having a diameter of 20 mm and a length of 1,000 mm and equipped with a pyrex glass jacket Each column was uniformly packed with an anion exchange resin up to a height of 900 mm. The anion exchange resin was a strong, basic anion resin having an exchange capacity 4.3 milliequivalent/g, which was produced by amination of chloromethylated styrene-divinylbenzene crosslinked copolymer with trimethylamine. Each of the electrically operable, four-way switch-over valves i, j, k, l, m and n, was connected to the inlet and outlet of the columns III, IV and V, respectively. A supplementary oxidizing apparatus C included a jacketed, pressure resistant column having a diameter of 20 mm and a length of 500 mm and packed with glass Rashing rings in four stages and a gas-liquid separator having a volume of 300 ml and connected to the column. The oxidation reaction was carried out by concurrently introducing oxygen gas and an eluant from the bottom of the column to contact with each other. A supplementary reducing apparatus D included a jacketed, pressure resistant column having a diameter of 20 mm and a length of 500 mm and packed with a reducing catalyst in four stages and a gas-liquid separator having a volume of 300 ml and connected to the column. The reduction reaction was carried out by concurrently introducing hydrogen gas and an eluant from the bottom of the column to contact with each other in a manner similar to the oxidation reaction. The catalyst employed was prepared by supporting 2% by weight of platinum metal on spherical carbon particles having a diameter of 3 mm as the carrier.

1,000 ml of a solution containing 0.80 M of divalent iron ion, 0.80 M of tetravalent titanium ion and 3.1 M of hydrochloric acid was charged in a reservoir 1. 2,000 ml of a solution containing 0.80 M of trivalent titanium ion and 3.5 M of hydrochloric acid was charged in a reservoir 2 and 500 ml of a solution containing 0.4 M of tetravalent uranium ion and 3.5 M of hydrochloric acid was charged in a reservoir 4.

First, the solution in the reservoir 1 was supplied through a route 1-i-III to convert Fe(II) which is a deactivated oxidizing agent and Ti(IV) which is a deactivated reducing agent to Fe(III) which is an activated oxidizing agent—and Ti(III) —which is an activated reducing agent-, respectively, and to adsorb Fe(III) on an exchanger in the developing column III.

The eluant from the developing column III containing mainly Ti(III) out also containing some amount of Ti(IV)—which is not converted to Ti(III) in the developing column III—was charged in the supplementary reducing apparatus D through a route III-j-D to convert the mixing Ti(IV) to Ti(III) and then the resulting solution was stored in the reservoir 2.

Second, a uranium solution in the reservoir 4 was supplied through a route 4-i-III-j-C-1 to form a U(VI) adsorption zone in the developing column III, the eluant from the developing column III was supplied to the supplementary oxidizing apparatus C for the oxidizing of Ti(III) mixed in the developing column III and the resulting solution was stored in the reservoir 1 Simultaneously, a solution in the reservoir 1 containing Ti(IV) and Fe(II) was supplied through a route 1-m-V-n-D-2 to regenerate Ti(III) and Fe(III), and to form a Fe(III) adsorption zone in the developing column V and store the Ti(III) obtaned in the reservoir 2.

When the U(VI) adsorption zone reached the vicinity of the lower portion of the developing column III, the eluant from the developing column III was supplied through a route III-j-m-V to form a U(VI) adsorption zone over the developing columns III and V. A length of the U(VI) adsorption zone in the stationary stage was controlled to be about 1,500 mm. During this time, a solution containing Ti(IV) and Fe(II) in the reservoir 1 was supplied through a route 1-k-IV to regenerate Ti(IV) and Fe(II) and to form a Fe(III) adsorption zone in the developing column IV.

Subsequently, a solution containing Ti(III) in the reservoir 2 was supplied through a route 2-i-III-j-m-V to move the U(VI) adsorption zone over the developing columns III and V.

When the front boundary of the U(VI) adsorption zone had reached the lower portion of the developing column V, the flow route of the eluant from the developing column V was switched over to a route V-n-k-IV from a route V-n-C-1 to move the U(VI) adsorption zone over the developing columns V and IV.

After the rear boundary of the U(VI) adsorption zone had passed through the developing column III to the developing column V, the flow route was switched over to a route 2-m-V-n-k-IV-l-C-1-i-III-j-D-2.

At this time, the U(VI) adsorption zone spread over the developing columns V and IV and a Fe(III) adsorption zone was reformed in the developing column III.

When the U(VI) adsorption zone had moved to the developing column IV from the developing column V, the flow route of the solution was switched over to a route 2-k-IV-l-i-III-j-C-1-m-V-n-D-2.

Thus, the uranium adsorption zone was moved by successively switching over the solution flow route.

The flow rate of the solution through the entire system was 22 cc/min. and the temperature of the system was maintained at 120° C.

In the supplementary reducing apparatus D, small amounts of hydrogen gas were charged to maintain the Ti(III) concentration in the reservoir 2, which had a tendency to decrease as the uranium separation proceeded. Simultaneously, the equimolar oxygen gas was charged in the supplementary oxidizing apparatus C.

After the uranium adsorption zone had been moved four times repeatedly through this system, the uranium solution was fractionally collected in the reservoir 3 and the isotope ratio of uranium in each fraction was measured with a mass spectrometer.

The isotope ratio (235 U/238 U) of natural uranium was 0.007253. The isotope ratio of uranium in the fraction closest to the rear boundary between the uranium adsorption zone and the reducing agent zone, was 0.00756. In the stationary state, the consumption of oxygen gas or hydrogen gas was 0.92 equivalent based on the uranium oxidized at the boundary between the uranium adsorption zone and the oxidizing agent zone or reduced at the boundary between the uranium adsorption zone and the reducing agent zone.

EXAMPLE 2

Using the same system as in Example 1, 1,000 ml of a solution containing 0.80 M of divalent iron ion, 0.80 M of tetravalent titanium ion and 5.4 M of hydrochloric acid was charged in the reservoir 1. 2,000 ml of a solution containing 0.80 M trivalent titanium ion and 5.4 M of hydrochloric acid was charged in the reservoir 2 and 500 ml of a solution containing 0.4 M of tetravalent uranium ion and 5.4 M of hydrochloric acid was charged in the reservoir 4.

The start-up operation was carried out in the same manner as in the three developing column operation system in FIG. 2, and the length of the uranium adsorption zone in the stationary state was controlled to be about 1,500 mm.

By the same operation as in Example 1, chromatography development was carried out.

The flow rate of the solution through the entire system was 24 cc/min and the temperature of the system was maintained at 140° C.

After the uranium adsorption zone had been moved four times repeatedly through this system, the uranium solution was fractionally collected in the reservoir 3 and the isotope ratio of uranium in each fraction was measured with a mass spectrometer The isotope ratio of natural uranium was 0.007253 and the isotope ratio of uranium in the fraction closest to the rear boundary between the uranium adsorption zone and the reducing agent zone, was 0.00767. In the stationary state, the consumption of oxygen gas or hydrogen gas was 0.49 equivalent based on the uranium oxidized at the boundary between the uranium adsorption zone and the oxidizing agent zone or reduced at the boundary between the uranium adsorption zone and the reducing agent zone.

EXAMPLE 3

Using the same system as in Example 1, 1,000 ml of a solution containing 0.6 M of divalent iron ion, 0.6 M of tetravalent vanadium ion and 4.5 M of hydrochloric acid was charged in the reservoir 1. 2,000 ml of a solution containing 0.6 M of trivalent vanadium ion and 4.5 M of hydrchloric acid was charged in the reservoir 2, and 500 ml of a solution containing 0.1 M of tetravalent uranium ion and 4.5 M of hydrochloric acid was charged in the reservoir 4.

The start-up operation was carried out in the same manner as in the three developing column operation system in FIG. 2, and the length of the uranium adsorption zone in the stationary state was controlled to be about 1,500 mm.

By the same operation as in Example 1, the chromatography development was carried out.

The flow rate of the solution through the entire system was controlled to be 24 cc/min. and the temperature of the system was maintained at 140° C.

After the uranium adsorption zone had been moved four times repeatedly through this system, the uranium solution was fractionally collected in the reservoir 3 and the isotope ratio of uranium in each fraction was measured with a mass spectrometer.

The isotope ratio of natural uranium was 0.007253 and the isotope ratio of uranium in the fraction closest to the rear boundary between the uranium adsorption zone and the reducing agent zone, was 0.00819. In the stationary state, the consumption of oxygen gas or hydrogen gas was 0.36 equivalent based on the uranium oxidized at the boundary between the uranium adsorption zone and the oxidizing agent zone or reduced at the boundary between the uranium adsorption zone and the reducing agent zone.

COMPARATIVE EXAMPLE

Using the same system as in Example 1, 1,000 ml of a solution containing 0.3 M of trivalent iron ion, 0.3 M of tetravalent titanium ion and 3.0 M of hydrochloric acid was charged in the reservoir 1. 15,000 ml of a solution containing 0.3 M of trivalent titanium ion and 3.0 M of hydrochloric acid was charged in the reservoir 2 and 500 ml of a solution containing 0.15 M of tetravalent uranium ion and 3.0 M of hydrochloric acid was charged in the reservoir 4.

The basic flow route of the solution was substantially the same as in Examples 1 - 3, except that a sufficient amount of the oxygen gas necessary for activation of the deactivated oxidizing agent was charged in the supplementary oxidizing apparatus C to maintain the original composition of the solution in the reservoir 1.

The flow rate of the solution through the entire system was controlled to be 23 cc/min. and the temperature of the system was maintained at 140° C. After the uranium adsorption zone had been moved four times repeatedly through this system, the uranium solution was fractionally collected in the reservoir 3 and the isotope ratio of uranium in each fraction was measured with a mass spectrometer.

The isotope ratio of natural uranium was 0.007253. The isotope ratio of uranium in the fraction closest to the rear boundary between the uranium adsorption zone and the reducing agent zone, was 0.00781. In the stationary state, the consumption of oxygen gas or hydrogen gas was 1.00 equivalent based on the uranium oxidized at the boundary between the uranium adsorption zone and the oxidizing agent zone or reduced at the boundary between the uranium adsorption zone and the reducing agent zone.

What is claimed is:

1. In a process for continuously separating uranium isotpes by passing an acidic solution of a mixture of uranium isotepes in a solvent through an anion exchanger thereby forming on the anion exchanger a boundary (A) between a uranium adsorption zone and an adjacent reducing agent zone and a boundary (B) between a uranium adsorption zone and an adjacent oxidizing agent zone, advancing the uranium adsorption zone through the anion exchanger, effecting reduction at the boudary (A) and effecting oxidation at the boundary (B), thereby effecting enrichment adjacent said boundary, and separating a fraction enriched in one of said isotopes, the improvement which comprises passing an eluant containing a deactivated oxidizing agent and a deactivated reducing agent as a mixture through the anion exchanger to be used for isotope separation to convert said deactivated oxidzing agent and said deactivated reducing agent to activated oxidizing agent and activated reducing agent, respectively, and to form an oxidzing agent zone in the column, and reusing said activated reducing agent for the reduction of uranium.

2. The process as claimed in calim 1, wherein the separation of uranium isotopes is continuously carried out by repeating a procedure using at least two developing columns packed with an anion exchanger which comprises:
   forming a uranium adsorption zone in at least one developing column;
   displacing the uranium adsorption zone through the column;
   feeding an eluant containing a deactivated oxidizing agent and a deactivated reducing agent into at least one remaining developing column to activate the deactivated oxidizing agent and the deactivated reducing agent and to form an oxidizing agent zone;
   transferring the uranium adsorption zone after completion of forming of the resulting oxidizing zone for the oxidation of uranium; and
   reusing the activated reducing agent for the reduction of uranium.

3. The process as claimed in claim 2, wherein an eluant containing a deactivated oxidizing agent and a deactivated reducing agent is fed into a supplementary oxidizing apparatus, thereby oxidizing a reducing agent mixed in the eluant, then the resulting eluant is fed into at least one remaining developing column to activate the deactivated oxidizing agent and the deactivated reducing agent and to form an oxidizing agent zone, and the eluant from the developing column used for the regeneration is fed into a supplementary reducing apparatus to reduce the deactivated reducing agent mixed in the eluant.

4. The process as claimed in claim 1, wherein the oxidizing agent is at least one member selected from the group consisting of metal ions of T((III), Pb(IV), Sb(V), V(IV), Cr(VI), Mn(VII), Fe(III), Co(III) and Cu(II).

5. The process as claimed in claim 1, wherein the reducing agent is at least one member selected from the group consisting of metal ions of In(I), Sn(II), Sb(III), Ti(III), V(III) and Cu(I).

6. The process as claimed in claim 1, wherein the oxidizing agent is at least one member selected from the group consisting of metal ions of Cr(VI), Mn(VII), Fe(III) and Cu(II), and the reducing agent is at least one member selected from the group consisting of metal ions of Sn(II), Ti(III) and V(III).

7. The process as claimed in claim 1, wherein the uranium isotope separation is carried out in an acidic solution of the hydrogen ion concentration from about $10^{-3}$ M to about 11 M.

8. The process as claimed in claim 1, wherein the hydrogen ion concentration is from about $10^{-1}$ M to about 10 M.

9. The process as claimed in claim 1, wherein the uranium isotope separation is carried out at the temperature from about 10° C. to about 250° C.

10. The process as claimed in claim 9, wherein the temperature is from about 30° C. to about 200° C.

* * * * *